(12) United States Patent
Martin

(10) Patent No.: US 9,051,416 B2
(45) Date of Patent: Jun. 9, 2015

(54) RESIN COMPOSITIONS WITH HIGH THERMOPLASTIC LOADING

(75) Inventor: Cary Joseph Martin, Livermore, CA (US)

(73) Assignee: Hexcel Corporation, Dublin, CA (US)

( * ) Notice: Subject to any disclaimer, the term of this patent is extended or adjusted under 35 U.S.C. 154(b) by 620 days.

(21) Appl. No.: 12/838,713

(22) Filed: Jul. 19, 2010

(65) Prior Publication Data

US 2010/0276055 A1  Nov. 4, 2010

Related U.S. Application Data

(62) Division of application No. 11/168,971, filed on Jun. 28, 2005.

(51) Int. Cl.

| | | |
|---|---|---|
| B32B 27/38 | (2006.01) | |
| B32B 15/092 | (2006.01) | |
| C08G 59/32 | (2006.01) | |
| B32B 5/28 | (2006.01) | |
| B32B 15/02 | (2006.01) | |
| B32B 15/08 | (2006.01) | |
| B32B 15/14 | (2006.01) | |
| B32B 27/04 | (2006.01) | |
| B32B 27/08 | (2006.01) | |
| C08G 59/40 | (2006.01) | |
| C08L 63/00 | (2006.01) | |
| C08L 81/06 | (2006.01) | |

(52) U.S. Cl.
CPC ............ *C08G 59/3227* (2013.01); *B32B 5/28* (2013.01); *B32B 15/02* (2013.01); *B32B 15/08* (2013.01); *B32B 15/14* (2013.01); *B32B 27/04* (2013.01); *B32B 27/08* (2013.01); *B32B 27/38* (2013.01); *B32B 2260/021* (2013.01); *B32B 2260/046* (2013.01); *B32B 2274/00* (2013.01); *B32B 2307/202* (2013.01); *B32B 2307/558* (2013.01); *B32B 2307/718* (2013.01); *B32B 2605/18* (2013.01); *C08G 59/4021* (2013.01); *C08L 63/00* (2013.01); *C08L 81/06* (2013.01); *C08L 2205/02* (2013.01)

(58) Field of Classification Search
CPC ........................................................ C08L 63/00
USPC ........................................................ 428/418
See application file for complete search history.

(56) References Cited

U.S. PATENT DOCUMENTS

| 4,962,162 | A | * | 10/1990 | Kosuda et al. | 525/422 |
|---|---|---|---|---|---|
| 5,225,265 | A | * | 7/1993 | Prandy et al. | 428/138 |
| 5,278,224 | A | * | 1/1994 | Olesen et al. | 524/538 |
| 5,397,618 | A | * | 3/1995 | Cedarleaf | 428/138 |
| 6,391,959 | B1 | * | 5/2002 | Ninomiya et al. | 524/495 |
| 2002/0079052 | A1 | * | 6/2002 | Zhou et al. | 156/307.7 |
| 2002/0147283 | A1 | * | 10/2002 | Kim et al. | 525/423 |
| 2009/0076185 | A1 | * | 3/2009 | Berit-Debat et al. | 522/181 |

* cited by examiner

*Primary Examiner* — Megan McCulley
(74) *Attorney, Agent, or Firm* — W. Mark Bielawski; David J. Oldenkamp

(57) ABSTRACT

Uncured thermosetting resins are loaded with relatively high amounts of solid thermoplastic resin particles to form a resin precursor. The resin precursor is heat treated so as to produce an uncured resin composition wherein the thermoplastic resin particles become substantially dissolved in the thermosetting resin without causing cure of the resin mixture. Heat treatment of highly loaded thermosetting resins in accordance with the present invention provides uncured resin compositions that are well suited for use in fabricating composite structures and particularly prepreg for use in lightning protection surface coatings.

20 Claims, 1 Drawing Sheet

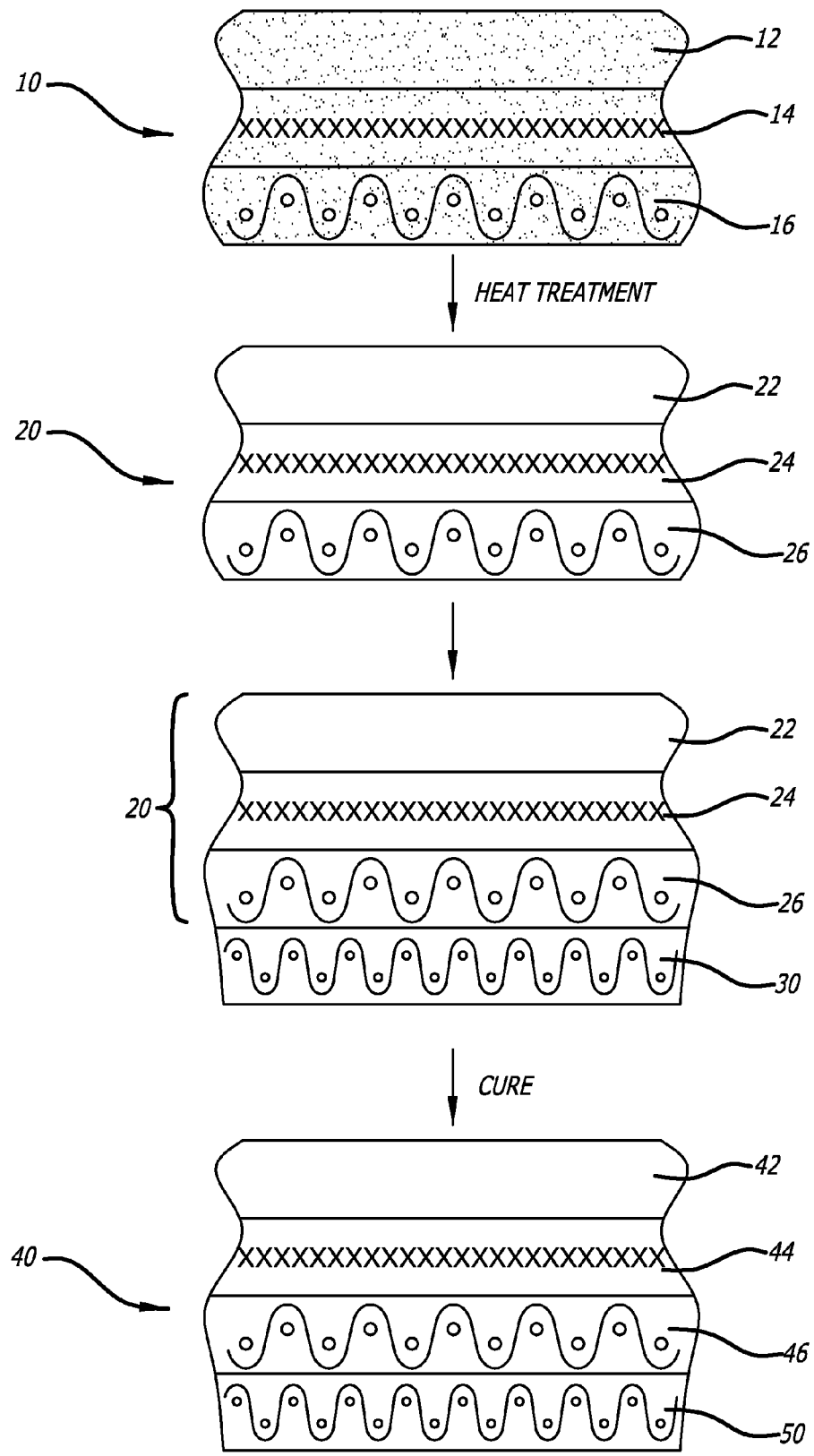

RESIN COMPOSITIONS WITH HIGH THERMOPLASTIC LOADING

This application is a divisional of co-pending U.S. patent application Ser. No. 11/168,971, which was filed on Jun. 28, 2005.

BACKGROUND OF THE INVENTION

1. Field of the Invention

The present invention relates generally thermosetting resin compositions that include varying amounts of one or more thermoplastic resins, which provide elastomeric toughening of the resin. More particularly, the present invention involves compositions and methods wherein the amount of thermoplastic resin in uncured thermosetting resin compositions is maximized to provide desired levels of resin toughening. These relatively high levels of thermoplastic loading are achieved without increasing the viscosity and/or tack of the uncured composition to levels that would render them unsuitable for handling and processing.

2. Description of Related Art

Thermosetting resins are popular materials that are used in the fabrication of a wide variety of composite materials. Epoxy resins, bismaleimide resins and cyanate ester resins are examples of popular thermosetting resins. Composite materials typically include one or more resins that are combined with fibers or other support materials to form relatively lightweight structures that are relatively strong. In addition to their wide spread use as a matrix material in composites, thermosetting resins have also been used to provide a surface layer or finish coating on the exterior surface of composite materials. Composite materials and surface coatings or layers that utilize thermosetting resins have been widely used in the aerospace industry where their combination of lightweight and structural strength is particularly desirable.

In many situations it is desirable to modify thermosetting resins by adding one or more thermoplastic resins to the thermosetting resin mix. The use of thermoplastic resins provides an additional degree of flexibility or elasticity to the thermosetting resin which increases the toughness of the final cured resin product. Such thermoplastic toughened resins have been used both as resin matrix materials in combination with fibers and as coatings where a particularly tough resin is desired. Typical thermoplastic resins that have been used as toughening agents include polyethersulfone, polyetherimide and certain types of nylon and other thermoplastic polymers that can be dissolved in the thermosetting resin prior to ultimate cross-linking and cure.

In general, the degree of elastomeric toughening provided by the thermoplastic resin is related directly to the amount of thermoplastic resin that is incorporated into the thermosetting resin mixture. Accordingly, it is desirable in many situations to add as much thermoplastic resin as possible to achieve maximum toughening of the final cured resin. High thermoplastic loading is particularly desirable for thermosetting resins that are used as surface coatings on aircraft structures where extremely smooth and strong surfaces are desired in order to enhance the aerodynamics and appearance of the structure.

The amount of thermoplastic resins that can be added to thermosetting resin mixtures is limited by a number of practical considerations relating to processing of the uncured resin. For example, the viscosity of the uncured toughened resin must be kept low enough that the resin can be fabricated into thin films and/or used to impregnate or coat various materials. In addition, the tack of the resin must also be kept within certain limits that vary depending upon the particular fabrication process. For example, the resin cannot be fabricated into films or handled during fabrication of multi-component structures if the uncured resin is too tacky. High viscosity and high tack is a particular problem when uncured toughened resins are used in the fabrication of surface coatings. High viscosity and high tack cause handling problems that lead to surface imperfections that have a deleterious effect on appearance and may an adverse effect on aerodynamics. As a result, the amount of thermoplastic resin that is loaded into thermosetting resins for use in surface coatings is typically below 25 weight percent.

The thermosetting and thermoplastic resins that are used to make composite materials do not conduct electricity. The most common fibers used in composite materials (such as glass, ceramics and graphite) are not good conductors of electricity. This is a particular problem for aircraft because they operate in an environment where they may be exposed to lightning. It is well known that a lightning strike on an aircraft that includes substantial amounts of composite material may result in catastrophic failure of the aircraft. In order to protect against such catastrophic events, the composite material used in many aircraft are modified to include "lightning protection". Lightning protection typically involves adding one or more layers of conductive material to the composite materials used to make the aircraft. The conductive layers are generally located on or near the exterior surfaces of the composite portions of the aircraft. The conductive materials used for lightning protection are usually thin films of metal (or other conductive material) or metallic mesh or fabric that is relatively lightweight.

There are many different ways to add lightning protection to the surface of a composite structure. A common procedure involves preparing a "prepreg" that is lightning protected and incorporating the prepreg into the surface of the composite structure. "Prepreg" is a term used in the composite industry to describe a composite precursor wherein one or more layers of fabric have been impregnated with uncured resin. The resulting pre-impregnated structure is typically stored for later use in fabricating the final cured composite structure. The preparation and use of prepregs is particularly desirable in the fabrication of aircraft and other critical structures because it allows the manufacturer to carefully control the amount of resin that is combined with a given amount of fabric. As a result, the final properties of the cured composite structure can be carefully controlled. Prepreg that is suitable for use as a lightning protection surface coating will typically include an electrically conductive layer located between a layer of surface finish resin and a supporting layer of fabric that has been pre-impregnated with resin. Examples of lightning protection prepreg and composites are set forth in the following U.S. Pat. Nos. 5,225,265; 5,470,413; 5,370,921 and 5,397,618.

Prepregs that are intended for use in providing lightning protection for composite structures should have certain desirable characteristics. The prepreg should be as light as possible to avoid adding unnecessary weight to the aircraft. The prepreg should be compatible with the underlying prepregs or other pre-cure composite materials used to make the final composite structure. The prepreg should also be relatively easily to handle and the surface finish provided by the cured prepreg should be relatively free of surface flaw or imperfections.

SUMMARY OF THE INVENTION

In accordance with the present invention, methods and compositions are provided wherein uncured thermosetting resins are initially loaded with relatively high amounts of solid thermoplastic resin particles to form resin precursors. These resin precursors are then heat treated so as to produce uncured resin compositions wherein the thermoplastic resin particles become substantially dissolved in the thermosetting resin without causing cure of the resin mixture. It was discovered that the heat treatment of highly loaded thermosetting resins in accordance with the present invention provides uncured resin compositions that are well suited for use in fabricating composite structures and particularly prepreg for use in lightning protection surface coatings.

The uncured resin compositions of the present invention include a thermosetting resin component that is made up of one or more thermosetting resins, a curing agent for the thermosetting resin(s) and a thermoplastic resin component that includes one or more thermoplastic resins. The thermoplastic resin component is combined with the thermosetting resin component by adding the thermoplastic resin(s) to the thermosetting resin(s) to form an uncured resin precursor. As a feature of the present invention, at least one of the thermoplastic resins is initially in the form of thermoplastic resin particles that are substantially dissolved in the thermosetting resin by heating the resin precursor for a sufficient time to dissolve the particles without causing curing of the resin precursor. The resulting uncured resin composition is highly loaded with thermoplastic resin while still retaining viscosity and tack properties that are appropriate for use in manufacturing prepreg and other composite materials.

The resin precursor may include thermoplastic resins that are only in particulate form or the precursor may include combinations of thermoplastic resin particles and thermoplastic resins that have been dissolved in the thermosetting resin. As a feature of the present invention, the viscosity and loading levels of the resin precursor can be controlled by varying the combinations of particulate and dissolved thermoplastic resins that are present in the resin precursor.

The uncured resin compositions in accordance with the present invention may be used in the fabrication of a wide variety of composite structures. The uncured resin compositions are well suited for use in fabricating surface finishes for composite structures where light weight, high toughness and good surface finishes are required. The uncured compositions are particularly well suited for use in fabrication prepreg and other uncured composite structures that are used to form surface finishes that also provide lightning protection.

The above-described and many other features and attendant advantages of the present invention will become better understood by reference to the following detailed description when taken in conjunction with the accompanying drawings.

BRIEF DESCRIPTION OF THE DRAWING

The drawing is a diagrammatic representation an exemplary method for making a lightning protected composite material using an exemplary prepreg in accordance with the present invention.

DETAILED DESCRIPTION OF THE INVENTION

The uncured resin compositions of the present invention basically include a thermosetting component, a curing agent and a thermoplastic component. The thermosetting component preferably includes one or more resins belonging to the group of thermosetting resins that are widely used in the aerospace industry. Exemplary thermosetting resins include epoxy, cyanate ester, and bismaleimide resins. Exemplary epoxy and cyanate ester resins include glycidylamine type epoxy resins, such as triglycidyl-p-aminophenol, tetraglycidyldiaminodiphenyl-methane; glycidyl ether type epoxy resins, such as bisphenol A type epoxy resins, bisphenol F type epoxy resins, bisphenol S type epoxy resins, phenol novolak type epoxy resins, cresol novolak type epoxy resins and resorcinol type epoxy resins; cyanate esters, such as 1,1'-bis(4-cyanatophenyl)ethane (AroCy L-10, available from Huntsman, Inc., Brewster, N.Y.), 1,3-Bis (4-cyanateophenyl-1-1-(1-methylethylidene) benzene (RTX366, available from Huntsman, Inc., Brewster, N.Y.). Epoxy resins are preferred.

The epoxy may be composed of trifunctional epoxy, difunctional epoxy and a wide variety of combinations of trifunctional and difunctional epoxies. Tetrafunctional epoxies may also be used. Especially preferred epoxy blends include a mixture of trifunctional epoxy and a difunctional bis-F epoxy. Exemplary trifunctional epoxy include triglycidyl p-aminophenol and N,N-Diglycidyl-4-glycidyloxyaniline (MY-0510 or MY-0500 available from Huntsman, Inc., Brewster, N.Y.). Exemplary difunctional epoxies which may be used in the resin include Bis-F epoxies, such as GY-281, LY-9703 and GY-285 which are available from Huntsman, Inc., Brewster, N.Y.). Bis-A epoxies, such as GY-6010 (Huntsman, Inc., Brewster, N.Y.) and DER 331 (Dow Chemical, Midland, Mich.) are suitable Bisphenol-A type epoxies and may also be used. An exemplary tetrafunctional epoxy is tetraglycidyl diaminodiphenyl methane (MY-721, MY-720 and MY-9512 available from Huntsman, Inc., Brewster, N.Y.).

Other suitable epoxies include phenol novolak type epoxy, cresol novolak epoxy and resorcinol type epoxy. Preferred bis-F epoxies include GY281 and GY285 which are available from Huntsman, Inc., Brewster, N.Y.

The curing agent is preferably an amine curing agent. Exemplary curing agents include dicyandiamide, 3,3-diaminodiphenylsulfone (3,3-DDS), amino or glycidyl-silanes such as 3-amino propyltriethoxysilane, CuAcAc/Nonylphenol (1/0.1), 4,4'-diaminodiphenylsulfone (4,4'-DDS), 4,4'-methylenebis(2-isopropyl-6-methylaniline), e.g., Lonzacure M-MIPA (Lonza Corporation, Fair Lawn, N.J.), 4,4'-methylenebis(2,6-diisopropylaniline), e.g., Lonzacure M-DIPA (Lonza Corp., Fair Lawn, N.J.). Dicyandiamide and 3,3-DDS are preferred curative agents. Especially preferred are combinations of 3,3-DDS and dicyandiamide.

The thermoplastic component preferably includes one or more thermoplastic resins. The thermoplastic resins are added to the thermosetting resin and curing agent to form a resin precursor wherein at least one of the thermoplastic resins is in the form of thermoplastic resin particles. The resin precursor will have various initial properties, including viscosity, tack, and drape, heat of reaction and uncured glass transition temperature. The uncured resin composition is formed by heating the resin precursor to a dissolution temperature for a sufficient time to substantially dissolve all of the resin particles without curing the thermosetting resin(s). An important aspect of the present invention is that the heating times and dissolution temperatures be selected to provide an uncured resin composition where substantial dissolving of the thermoplastic resin particles has taken place without curing of the thermosetting resin(s).

For the purposes of this specification, particles that have lost at least 80 weight percent of their original particle weight are considered to be substantially dissolved. Preferably, the particle will have lost at least 90 weight percent of the original particle weight. Most preferred is where 95 weight percent or more of the particle has dissolved. The term "without curing the thermosetting resin(s)" means that resin precursor and the resulting uncured composition are maintained under conditions such that the heat of reaction, and other measures of curing, such as the number of functional groups per mass or mole of resin, do not change to any appreciable degree. In general, the change in these properties that reflect the degree of curing should not change by more than 10-15 percent during the dissolution step.

A relatively small amount of curing is acceptable, but to the extent possible, the dissolution temperature that the resin precursor is subjected to should be sufficiently high to dissolve the thermoplastic particles, while at the same time being sufficiently below the cure temperature of the thermosetting resin to avoid curing. It should be noted that the properties of the resin precursor, such as viscosity and tack, will usually change significantly during the heat treatment step without any curing of the thermosetting resin taking place. For example, during the heat treatment step, the tack of the resin precursor can be substantially reduced such that the resulting uncured composition is essentially tack-free. The color of the resin precursor will typically change from an opaque white to a translucent amber-brown. In addition, the viscosity of the resin precursor will substantially increase during the heat treatment step. Accordingly, it is preferred that the resin precursors be formed into films or combined with fibers to form prepregs or other structures prior to the heat treatment step.

The thermoplastic resins may be added to the thermosetting resin to form resin precursors that include varying degrees of particulate and dissolved thermoplastic resin. It is not required that all of the thermoplastic resin in the resin precursor be present in particulate form. The presence of some dissolved thermoplastic resin in the resin precursor is preferred. The amount of dissolved thermoplastic resin in the resin precursor should be about 30 percent or less by weight of the overall resin precursor and preferably between 5 and 25 percent by weight with 10 to 20 weight percent being most preferred. The amount of particulate thermoplastic should preferably be between 15 and 50 weight percent. The amount of total thermoplastic loaded into the resin precursor will range from 20 to 60 weight percent.

Exemplary thermoplastic resins that are for dissolution in the initial resin precursor include thermoplastic polyetherimides such as ULTEM® 1000P which is available from General Electric (Pittsfield, Mass.); micronized polyethersulfone such as 5003P, which is available from Sumitomo Chemical Co., Ltd. (Osaka, Japan); HRI-1, which is available from Hexcel Corp. (Dublin, Calif.); and polyimide MATRIMID® 9725 or 5218, which are available from Huntsman, Inc. (Brewster, N.Y.). ULTEM® 1000P and micronized PES are preferred. Micronized PES is especially preferred. Micronized PES refers to PES particles which have a rough surface configuration which is produced by grinding the particles or other abrasive techniques of manufacture which are known in the art. Micronized PES particles may also be made by spraying and drying procedures which are also known in the art. Micronized PES particles are preferably less than 120 microns in size. Especially preferred are particles under 50 microns in size with a range of 10 to 25 microns being particularly preferred.

Densified polyethersulfone (PES) and densified polyetherimide particles may be used as suitable thermoplastic particles. Densified PES particles are preferred. The densified polyethersulfone (PES) particles are preferably made in accordance with the teachings of U.S. Pat. No. 4,945,154, the contents of which is hereby incorporated by reference. The average particle size of the PES particles range from 1 to 150 microns. Average particle sizes of 1 to 50 microns are preferred and average particle sizes of 10 to 25 microns are particularly preferred. It is preferred that the glass transition temperature (Tg) for the particles be above 200° C.

The amount and type of thermoplastic particles that are added to the epoxy resin mixture and the order in which they are added may be varied provided that the viscosity of the final resin precursor is between 20,000 and 100,000 poise when said viscosity is measured at 30° C. The preferred viscosity range is 30,000 to 90,000 poise. In a preferred embodiment, the micronized thermoplastic particles are added first and dissolved. Then, densified thermoplastic particles are added to form a resin precursor that includes both dissolved and particulate thermoplastic. As mentioned above, overall thermoplastic loading (dissolved and particulate) of the resin precursor should be between 20 and 60 weight percent. The viscosity of the heat-treated resin precursor increases substantially during the heat treatment process. The precise amount of increase in viscosity depends upon the particulars of the formulation.

In a preferred exemplary procedure, the uncured resin is made by first mixing the epoxy components together and then slowly adding the desired amount of micronized thermoplastic resin particles. Micronized polyetherimide or micronized PES particles are preferred. The resulting mixture is heated to around 130° C. and mixed for a sufficient time to substantially dissolve the micronized thermoplastic particles. Once the micronized thermoplastic particles are dissolved, the mixture is cooled to around 75° C. A suitable aromatic amine curing agent and the desired amount of densified PES particles are then added to the mixture to form the resin precursor. The resin precursor should be kept at temperatures below about 70-75° C. while the curative agent and densified PES particles are being mixed into the resin.

Once formed, the resin precursor may be impregnated into fabric/fibers to form prepreg, used to form films or applied to any number of surfaces or structures. The resin precursor is then heated at the dissolution temperature for a sufficient time to dissolve the densified PES particles and form an uncured resin. Typical dissolution temperatures are from 110 to 140° C. with dissolution temperatures of about 125° C. being preferred. The heat treatment times will vary depending upon the dissolution temperature, particular thermoplastics and thermosets being used as well as the amount of particulate loading. The amount of time required to convert a specific resin precursor to the uncured resin can be determined by routine experimentation. In general, heat treatment times on the order of a few minutes up to 1 hour are sufficient. The final uncured resin, along with any fabric/fiber or other supporting component is then cooled to room temperature. The final uncured resin, whether it is in the form of a film or the resin matrix in a prepreg or as part of some other structure, can then be stored for later use. Alternatively, the uncured resin and associated components, if any, may be used immediately by applying the uncured resin to a desired structure, if necessary, and then curing the uncured resin in accordance with conventional curing procedures for thermosetting resins that are loaded with thermoplastic material.

An exemplary method for making an electrically conductive composite material using the precursor resin in accordance with the present invention is shown diagramatically in the drawing. The composite is initially composed of a layer of precursor resin 12, which is located on top of a layer of electrically conductive material 14, such as expanded aluminum foil, wire mesh or other type of film that is used for lightning protection of composites. If the electrically conductive material 14 is porous, as in the case of fine wire meshes, it is preferred that the conductive material in layer 14 be impregnated with or otherwise include the precursor resin.

The electrically conductive layer 14 is in turn located on a prepreg layer 16 that includes fibers and a resin matrix. The resin matrix in layer 16 is preferably composed of the precursor resin, but may be another compatible type of resin, if desired. The fibers that are used in the prepreg layer 16 can be any of the fiber materials that are used to form composite laminates. Exemplary fiber materials include glass, aramid, carbon, ceramic and hybrids thereof. The fibers may be woven, unidirectional or in the form of random fiber mat. Woven carbon fibers are preferred, such as plain, harness satin, twill and basket weave styles that have areal weights from 80-600 grams per square meter (gsm), but more preferably from 190-300 gsm. The carbon fibers can have from 1,000-40,000 filaments per tow, but more preferably 3,000-12,000 filaments per tow. All of which are commercially available. Similar styles of glass fabric may also be used with common types being 6080 and 7781 glass fabric. When unidirectional constructions are used, typical ply-weights are 150 gsm for carbon and 250 gsm for glass.

In accordance with the present invention, the composite structure 10 is heat-treated for a sufficient time and at a sufficient dissolution temperature, as previously described, to form an uncured electrically conductive resin composite 20 which includes a layer of uncured resin 22, a layer of lightning protection material 24 that may also include uncured resin in accordance with the present invention and a prepreg layer 26 that includes fibers and an uncured resin matrix. The uncured composite 20 can be stored for final application and curing at a later time, if desired.

An exemplary use for the uncured composite 20 is shown in the drawing where the uncured composite 20 is placed on a structure 30 and then cured in accordance with known procedures for curing thermosetting resins that are loaded with thermoplastic material to form the final cured composite as shown at 40. The final cured composite 40 includes a cured outer resin layer 42, lightning protection layer 44, cured prepreg layer 46 and the underlying structure 50. The underlying structure 50 can be a prepreg or other uncured structure that is cured simultaneously with the uncured resin in layers 22, 24 and 26. The uncured structure 30 (cured structure 50), on which the electrically conductive uncured composite 20 (cured composite 40) is located, is shown as a single layer for simplicity. Typically, structure 30 is only the surface layer of an underlying structure, such as an aircraft wing, tail section and/or fuselage.

Examples of Practice are as Follows:

EXAMPLE 1

A resin precursor was made having the following formulation:
27.0 weight percent MY-0510 (N,N-Diglycidyl-4-glycidyloxyaniline)
24.9 weight percent GY285 (bis-F epoxy)
15.8 weight percent 3,3'-Diaminodiphenylsulfone
1.3 weight percent Dicyandiamide
13.5 weight percent micronized Polyethersulfone (PES)
17.5 weight percent densified Polyethersulfone (PES)

Precursor resin formulations in accordance with this example may also be made wherein the amounts of MY-510, GY281 and 3,3-DDS are varied by up to ±15%. Also, the amounts of both types of PES may be varied by as much as ±40%. The amount of dicyandiamide may be varied by up to ±50%. The densified PES was made from PES 5003P, which is available from Sumitomo Chemical Co. Ltd. (Osaka, Japan). The PES was densified in accordance with U.S. Pat. No. 4,945,154. Average particle size was 10-25 microns with no more than 13 weight percent smaller than 5 microns and no more than 4 weight percent greater than 40 microns.

24.9 parts by weight of GY285 and 6.0 parts by weight of MY0510 were mixed in a resin kettle and heated, with stirring, to 65° C. Once this temperature is attained, 13.5 parts by weight micronized PES 5003P is added to the resin kettle. The mixture is then heated to 128±2° C. and held at this temperature for 75 minutes. At the end of 75 minutes, heating is removed and 21 parts by weight of MY0510 is added to the kettle. Stirring is continued as the mixture cools to 65° C. Then, 15.8 parts of 3,3-DDS is added and mixed for 15 minutes. 1.3 parts of dicyandiamide is then added and the mixture stirred for 5 minutes at 65° C. Finally, 17.5 parts of densified PES is added and stirred in for 10 minutes to form the resin precursor. The resin precursor was heated to 74° C. and coated on release paper by reverse-roll coater at about to form a film containing 245 gsm. The film was then heated for 3 minutes at 125° C. to form the uncured resin composition. During this time, the densified PES completely dissolved, resulting in an uncured resin film containing about 31 weight percent dissolved PES. This dissolution resulted in a color change from opaque white to translucent amber-brown. The tack was also substantially reduced to an essentially tack free state after the heat treatment and the viscosity increased substantially.

EXAMPLE 2

The same combination of thermosetting resins and curing agents as set forth in Example 1 were used to make resin precursors that contained 25, 37.5 and 50 weight percent PES. The PES was added in the same manner as Example 1 except that the differences in overall PES loading was accounted for by varying the amount of densified PES that was added. The amount of micronized PES that was initially dissolved was kept constant at 13.5 weight percent. Films of resin precursor were made in the same manner as Example 1. The films were subjected to the same heat treatment step with the same dissolution process being observed. The resulting uncured resin films underwent the same color change from opaque white to translucent amber-brown. The tack of the uncured resin films was also substantially less than the resin precursor films and the final viscosity of the uncured resin films was substantially higher.

EXAMPLE 3

A three layer uncured electrically conductive composite material as shown in the drawing was made as follows:

A resin precuror film 12 was prepared according to Example 1. The film 12 was combined with an expanded aluminum foil 14 and a prepreg 16 that was composed of 6080-glass fabric (48 gsm) and resin precursor (32 gsm) that was prepared as described in Example 1. The resulting lay-up 10 was heat treated for 5 minutes at 110° C. in order to substantially dissolve the PES particles without curing the lay-up. The resulting uncured electrically conductive composite structure 20 had substantially reduced tack.

The uncured composite structure 20 was applied as a surfacing layer to a number of composite structures that were each composed of 8 plies of unidirectional prepreg. The unidirectional prepreg contained unidirectional carbon fibers in an uncured epoxy resin matrix. The orientation of the unidirectional plies was −45, 90, 45 and 0. Upon final curing at 179° C. for 120 minutes, the uncured composite structure 20 was found to provide a good (i.e. smooth and defect free) surface finish. For comparison, lay-ups 10 that were not heat treated in accordance with the present invention were applied directly as a surfacing layer to the same composite structures and cured under the same conditions. The resulting surface finish was more pitted than the surface finish obtained using the heat-treated precursor resin film in accordance with the present invention.

Having thus described exemplary embodiments of the present invention, it should be noted by those skilled in the art that the within disclosures are exemplary only and that various other alternatives, adaptations and modifications may be made within the scope of the present invention. Accordingly, the present invention is not limited by the above-preferred embodiments, but is only limited by the following claims.

What is claimed is:

1. A method for forming a surfacing layer on an underlying structure, said method comprising the steps of:
   providing, a first layer comprising an uncured resin precursor which comprises a thermosetting resin component that comprises an epoxy resin, a curing agent for said thermosetting resin component, a first thermoplastic resin component comprising a first dissolved thermoplastic resin and a second thermoplastic component comprising thermoplastic particles wherein said first dissolved thermoplastic resin and said thermoplastic particles are present in amounts such that said uncured resin precursor has a viscosity of between 20,000 and 100,000 poise at 30°C. and wherein the total amount of said first and second thermoplastic components is from 20 to 60 weight percent of the total weight of said uncured resin precursor;
   heating the uncured resin precursor in said first layer to a sufficient temperature for a sufficient time to substantially dissolve said thermoplastic particles without cluing said thermosetting resin component to thereby form said first layer into a second layer comprising uncured resin which has a viscosity that is substantially higher than said uncured resin precursor;
   applying said second layer to an underlying structure to form an outer layer of uncured resin; and
   curing said outer layer of uncured resin to form said surfacing layer on said underlying structure.

2. A method according to claim 1 wherein said thermoplastic particles comprises particles of densified thermoplastic resin that have a glass transition temperature that is above 200° C.

3. A method according to claim 2 wherein said thermoplastic particles comprise thermoplastic resins selected from the group consisting of densified polyethersulfone and densified polyetherimide.

4. A method according to claim 1 wherein said first dissolved thermoplastic resin is selected from the group consisting of polyethersulfone and polyetherimide.

5. A method according to claim 1 wherein said first layer comprises a fibrous layer which comprises fibers that are impregnated with said uncured resin precursor.

6. A method according to claim 5 wherein said first layer comprises a resin layer which consists essentially of said uncured resin precursor wherein said fibrous layer is located between said resin layer and said underlying structure.

7. A method according to claim 1 wherein said first layer comprises a conductive layer that comprises electrically conductive material and said uncured resin precursor.

8. A method according to claim 7 wherein said first layer comprises a resin layer which consists essentially of said uncured resin precursor wherein said conductive layer is located between said resin layer and said underlying structure.

9. A method according to claim 8 wherein said first layer comprises a fibrous layer which comprises fibers that are impregnated with said uncured resin precursor, said fibrous layer being located between said conductive layer and said underlying structure.

10. A method according to claim 9 wherein said underlying structure is a composite structure.

11. A method according to claim 9 wherein said underlying structure is a composite structure which comprises unidirectional carbon fiber and an epoxy resin matrix.

12. A method according to claim 9 wherein said underlying structure is an aircraft wing, aircraft wing, aircraft tail section or aircraft fuselage.

13. A method according to claim 12 wherein said underlying structure comprises unidirectional carbon fiber and an epoxy resin matrix.

14. A method according to claim 8 wherein said underlying structure is a composite structure.

15. A method according to claim 8 wherein said underlying structure is a composite structure which comprises unidirectional carbon fiber and an epoxy resin matrix.

16. A method according to claim 1 wherein said first layer comprises a resin layer which consists essentially of said uncured resin precursor.

17. A method according to claim 1 wherein said underlying structure is a composite structure.

18. A method according to claim 17 wherein said underlying structure comprises woven or unidirectional fibers and a resin matrix.

19. A method according to claim 18 wherein said unidirectional fibers are carbon fibers and said resin matrix comprises an epoxy resin.

20. A method according to claim 18 wherein said resin matrix is uncured and wherein said uncured resin matrix is cured when said outer layer of uncured resin is cured.

* * * * *